(12) United States Patent
Carrabs et al.

(10) Patent No.: US 8,469,624 B2
(45) Date of Patent: Jun. 25, 2013

(54) DEVICE FOR FIXING ACCESSORIES IN A MOTORCYCLE, IN PARTICULAR FOR A WINDSHIELD

(75) Inventors: Stefano Carrabs, Santa Maria a Monte (IT); Alberto Gracci, Pontedera (IT)

(73) Assignee: Piaggio & C. SpA, Pontedera (Pisa) (IT)

( * ) Notice: Subject to any disclaimer, the term of this patent is extended or adjusted under 35 U.S.C. 154(b) by 379 days.

(21) Appl. No.: 12/803,792

(22) Filed: Jul. 7, 2010

(65) Prior Publication Data

US 2011/0058895 A1 Mar. 10, 2011

(30) Foreign Application Priority Data

Sep. 7, 2009 (IT) .............................. MI2009A1544

(51) Int. Cl.
*B25G 3/20* (2006.01)

(52) U.S. Cl.
USPC ........................................ 403/370; 296/78.1

(58) Field of Classification Search
USPC ............... 403/83, 109.1, 109.3, 109.5, 109.8, 403/154, 193, 196, 200, 248, 256, 314, 325, 403/330, 367–370, 374.1–374.4, 409.1, DIG. 8; 248/230.1, 230.7, 231.81; 296/78.1; 24/663, 24/673, 674, 676
See application file for complete search history.

(56) References Cited

U.S. PATENT DOCUMENTS 1,566,524 A * 12/1925 Dahlgren ........................ 24/109
2,929,600 A * 3/1960 Malachowski ................ 248/481

FOREIGN PATENT DOCUMENTS

| EP | 0 650 885 A1 | 5/1995 |
| EP | 1 362 776 A2 | 5/2003 |
| EP | 1 362 776 A3 | 11/2003 |
| EP | 0 114 144 | 7/2007 |
| GB | 610 916 | 10/1948 |
| GB | 701 934 | 1/1954 |
| GB | 741 877 | 12/1955 |
| GB | 1 594 770 | 8/1981 |
| GB | 2 263 250 A | 7/1993 |

* cited by examiner

*Primary Examiner* — Michael P Ferguson
*Assistant Examiner* — Daniel Wiley
(74) *Attorney, Agent, or Firm* — Hedman & Costigan, P.C.; Kathleen A. Costigan

(57) ABSTRACT

A device (10) for fixing accessories in a motorcycle, in particular for a windshield (14), having at least one shaft (12) insertable in a sleeve element (18) constrainable to a fixed component (16) of the motorcycle. A portion of the shaft (12) has at least one elastic spacer element (20) insertable into the sleeve element (18) and actuable by a reversible junction element (30) between an expanded position, in engagement within the sleeve element (18), and a rest position, extractable from the sleeve element (18). At least one axial locking element (34) is integrally applied on shaft (12) which engages with a corresponding axial locking element (38) constrained to the sleeve element (18).

3 Claims, 5 Drawing Sheets

DEVICE FOR FIXING ACCESSORIES IN A MOTORCYCLE, IN PARTICULAR FOR A WINDSHIELD

The present invention relates to a device for fixing accessories in a motorcycle, in particular for a windshield.

It is well known that at present, among the vehicles falling within the general category of motorcycles, a considerable diversification of models is proposed, among which there shall be found those "hybrid" vehicles that combine the peculiarities of motorcycles, in terms of handiness, with the stability of four-wheeled vehicles. Such "hybrid" vehicles are represented, for example, by the three-wheeled vehicles provided with two front steering wheels, which can be driven as a motorbike (that is, they are laterally tilting on a curve) while offering the usual stability of four-wheeled vehicles. It is therefore noted that in the following description, the term motorcycle refers to both traditional two-wheeled vehicles and to the above "hybrid" vehicles.

Various types of fixing devices are used for positioning accessories, such as for example a windshield, on board of a motorcycle. These fixing devices of the known type usually consist of conical couplings associated, on the one side, to a portion of the motorcycle, such as the handlebar, through stud bolts or bolts and, on the other side, to the windshield by sleeve elements, which are constrainable through bolts as well. Also in the case of assembly of accessories other than the windshield, such as luggage rails, rear-view mirrors or others, fixing devices are used which consist of a plurality of component parts associable by one or more bolts.

Since these fixing devices often attach to the motorcycle accessories not strictly necessary for proper operation, or which in any case must be able to be removed to carry out maintenance operations on the motorcycle itself, the possibility of removing such accessories by intervening on the relative fixing devices must be ensured. As a consequence, the fixing devices are generally provided with reversible junction means, such as nuts, levers or others, which allow easily removing the accessory from the motorcycle and applying it back again to the same according to the needs. If the required tightening torque is not applied to the above reversible junction means, the accessory could accidentally detach from the motorcycle, with clear problems in terms of safety.

The object of the present invention therefore is to provide a fixing device for accessories in a motorcycle, in particular for a windshield, capable of preventing accidental detachment of the accessory from the motorcycle also in the presence of loosening within the same fixing device.

Another object of the invention is to provide a fixing device for accessories in a motorcycle capable of minimising the aesthetic impact of the same fixing device on the motorcycle.

Yet another object of the invention is to provide a fixing device for accessories in a motorcycle the assembly operations whereof are simple and quick as it happens with the fixing devices of the prior art.

These objects according to the present invention are achieved by providing a device for fixing accessories in a motorcycle, in particular for a windshield, as described in claim 1.

Further features of the invention are described in the dependent claims that are an integral part of the present description.

The features and the advantages of a device for fixing accessories in a motorcycle, in particular for a windshield, according to the present invention will appear more clearly from the following description, made by way of an indicative non-limiting example with reference to the annexed schematic drawings, wherein.

Figure 1:
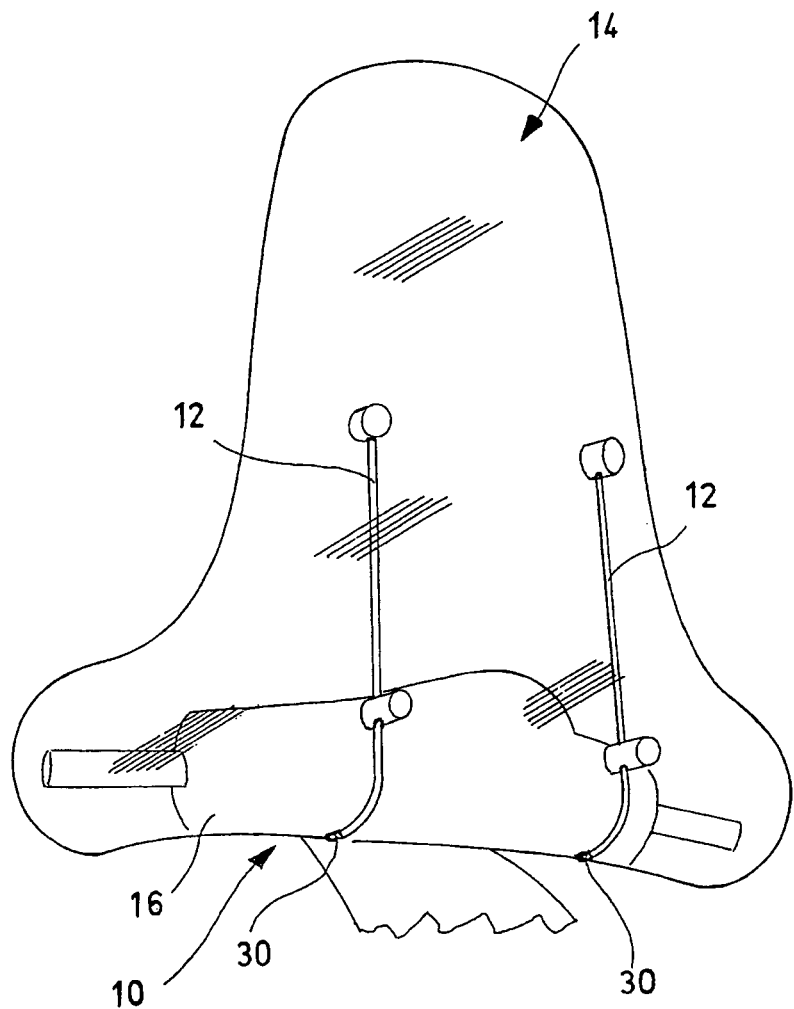
FIG. 1 shows a perspective view of a pair of fixing devices made according to the invention, applied to the handlebar of a motorcycle for supporting a windshield.
Figure 2:
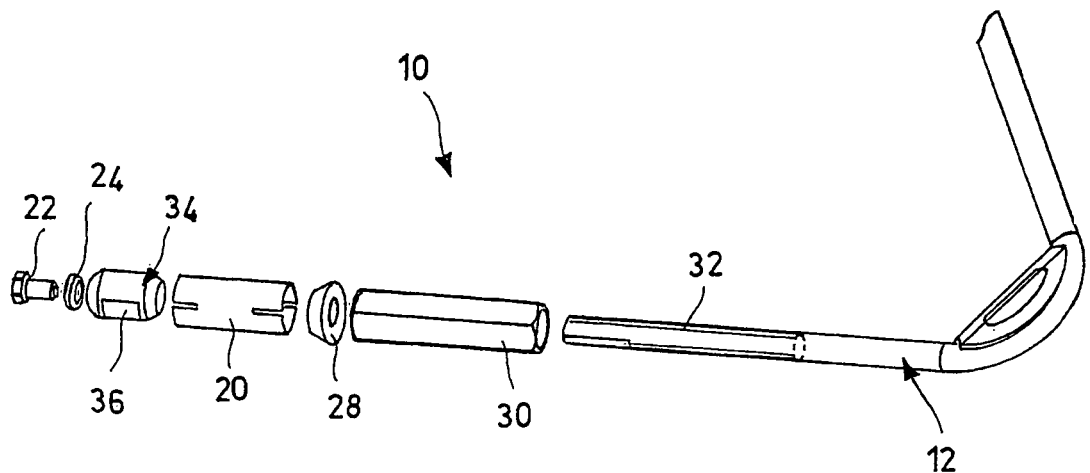
FIG. 2 shows an exploded view of some components of a fixing device according to the invention.

With reference to the figures, there is shown a device for fixing accessories in a motorcycle according to the present invention, globally indicated with reference numeral 10. In particular, as shown in FIG. 1, the fixing device 10 may be suitable for locking one of the shafts 12 for a windshield 14 relative to a fixed component of the motorcycle, such as the handlebar 16.

At least one tubular element or sleeve 18 is steadily attached, for example by welding, to the handlebar 16. In the sleeve 18 the free end of the shaft 12 is insertable, that is, the end whereon windshield 14 is not attached, through the interposition of at least one elastic spacer element 20.

More precisely, based on the exemplary embodiment shown in the figures, also the elastic spacer element 20 is made as a sleeve and at a first end thereof (that facing the free end of the shaft 12), it is refrained by fastening elements from axially sliding, consisting of a screw 22 with a hexagonal head and a relevant elastic washer 24. Screw 22 is configured to be inserted in a threaded blind hole 26 made axially at the free end of shaft 12.

The elastic spacer element 20 is therefore placed in contact, at the end thereof opposite that facing the free end of shaft 12, with a frusto-conical washer 28 which acts as thrust means. A special nut 30 shaped as a sleeve, provided with an inside threading 32a, engages with a threaded portion 32 of shaft 12 for moving the frusto-conical. washer 28 in abutment against the elastic spacer element 20 and thus form the reversible junction means that allow fixing of shaft 12 relative to sleeve 18 of handlebar 16, as is better specified hereinafter.

Figure 7:
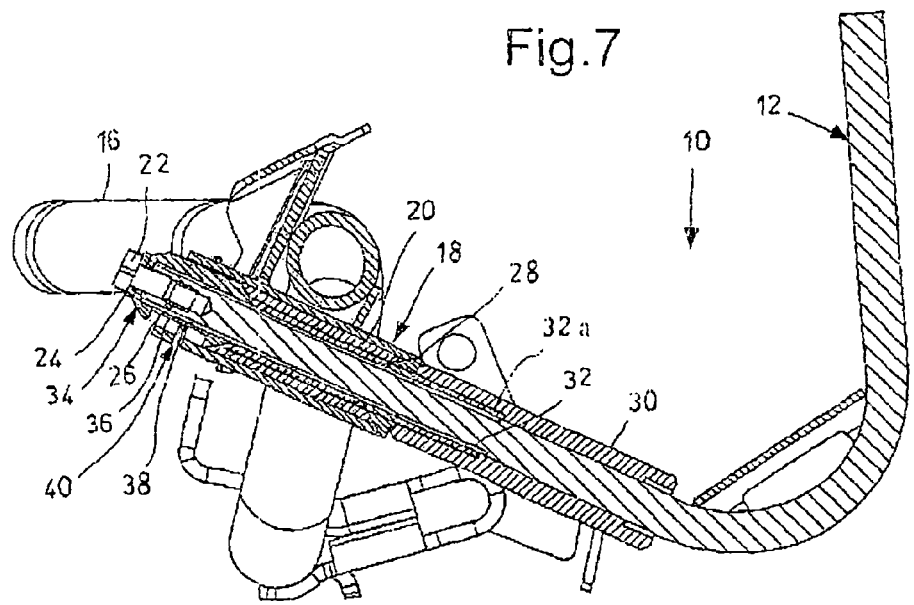
FIG. 7 shows a cutaway view, in an assembled and operative configuration, of the components of each of the fixing devices shown in FIG. 4.

According to the invention, at least one axial locking element 34 is integrally applied on shaft 12, preferably made as a cylindrical bushing provided with at least one flat grooved portion 36, which engages with a corresponding axial locking element 38, preferably made as a metal clip spring, attached to sleeve 18 of handlebar 16, for example by the insertion in a special notch 40 formed on the same sleeve 18 (FIG. 7). In this way, the retain in the axial direction of shaft 12 in the sleeve 18 is ensured also in the case of loosening of nut 30 and of the elastic spacer element 20, while the extraction of such shaft 12 from the same sleeve 18 is only allowed following the rotation, according to a predetermined angle, of the same shaft 12 around its axis.

Figure 3:
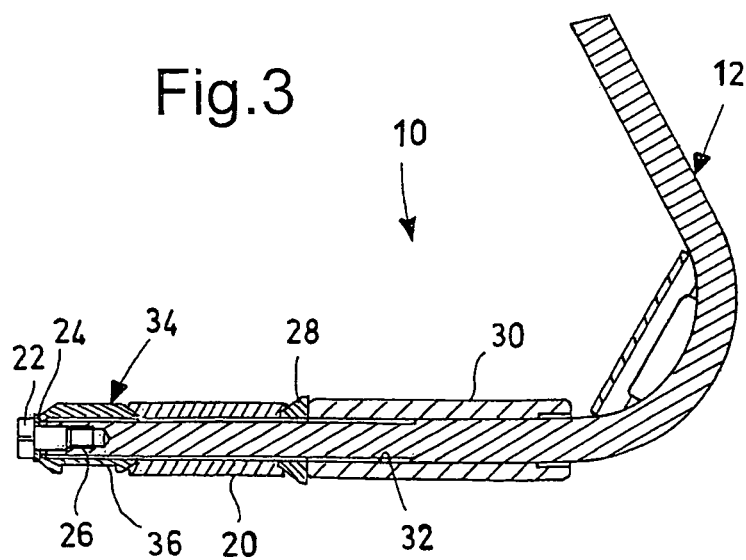
FIG. 3 shows a cutaway view, in an assembled but non-operative configuration, of the components of the fixing device shown in FIG. 2.

More precisely, the fixing device 10 according to the invention may be operated as follows. In the rest position of device 10, shown for example in FIG. 3, nut 30 is positioned around the threaded portion 32 of shaft 12 so as to not push the tapered portion of the frusto-conical washer 28 against the elastic spacer element 20, which therefore is at rest. It should be noted that the elastic spacer element 20, as well as the tapered portion of the frusto-conical washer 28 and the cylindrical bushing 34, exhibits a smaller outer circumference than the inside circumference of the tubular element or sleeve 18. In this way, such components are freely insertable in the tubular element 18, as well as freely removable therefrom, in the above rest position of device 10.

Figure 4:
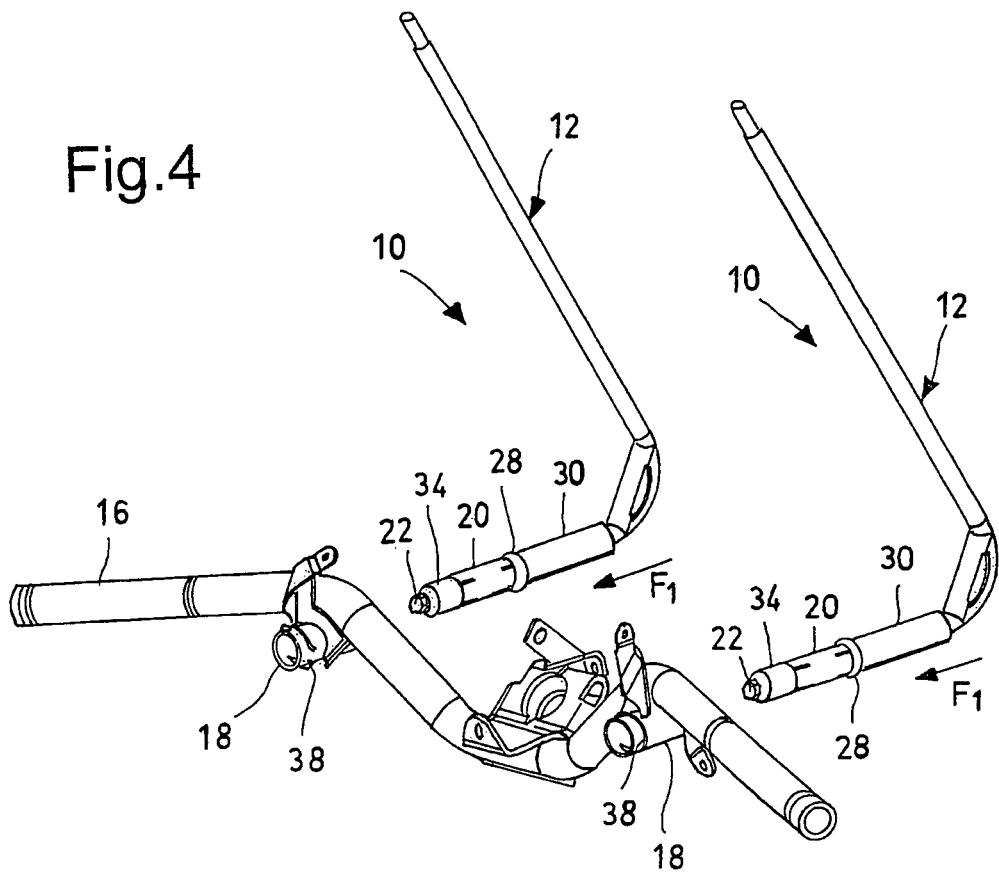
FIG. 4 shows a perspective view of a pair of fixing devices made according to the invention, which shows the mounting on the handlebar of a motorcycle.
Figure 5:
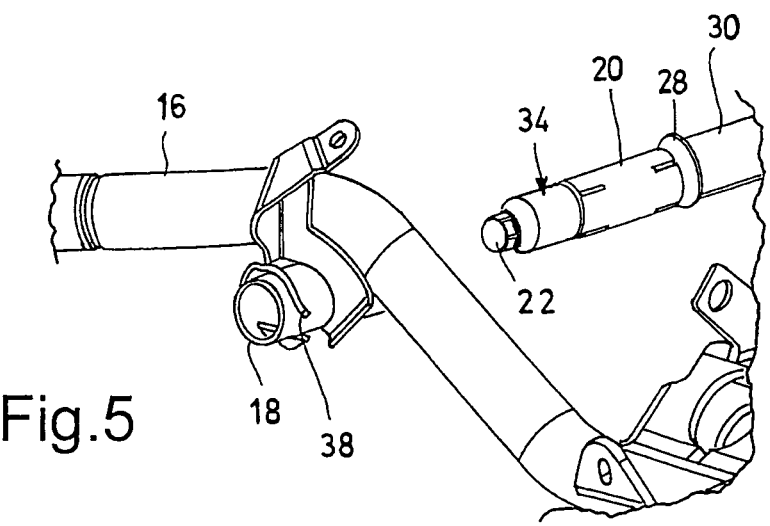
FIG. 5 shows a detailed view of a detail of FIG. 4.
Figure 6:
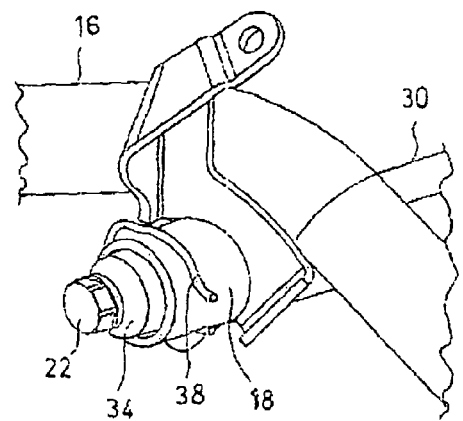
FIG. 6 shows a further detailed view of a detail of FIG. 4, with the fixing device in assembled and operating configuration.

In order to mount the accessory 14, the free end of shaft 12, with the components associated thereto, in the relieved or rest configuration above, is inserted into sleeve 18, in the axial direction indicated by arrows $F_1$ of FIG. 4. Upon inserting shaft 12 into sleeve 18, the clip spring 38 hooks snap-wise onto the flat grooved portion 36 of the cylindrical bushing 34, immediately ensuring the axial retain of the same shaft 12.

To steadily lock device 10, or devices 10 if a multiple use configuration is required, into position, nut 30 is then rotated in the screwing direction on the relative threaded portion 32 of shaft 12. Such operation determines a thrust action of the frusto-conical washer 28 on the elastic spacer element 20 which, retained by the cylindrical bushing 34 in turn held into position by screw 22 and by the relative washer 24, expands locking into sleeve 18, thus making shaft 12 integral with the motorcycle structure.

In order to remove each shaft 12, on the other hand, after optionally having removed windshield 14 or other accessory supported by device 10, it will be necessary to first loosen the respective nut 30 for moving the elastic spacer element 20 back into rest position. In such "loosened" configuration of device 10, however, there is still the engagement between the clip spring 38 and the flat grooved portion 36 of the cylindrical bushing 34, which act as safety system for preventing the accidental extraction of shaft 12 from sleeve 18.

Figure 8:
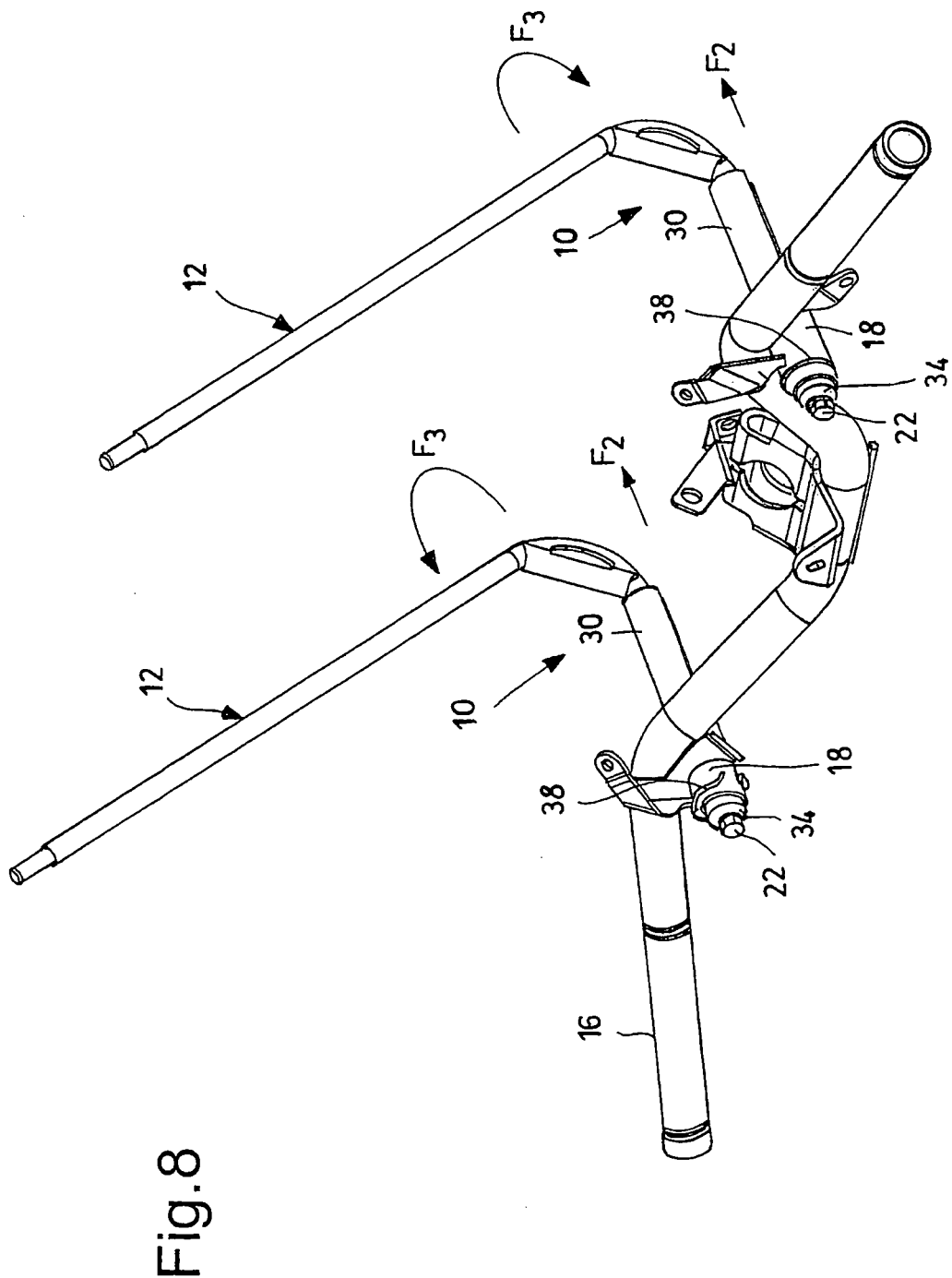
FIG. 8 shows a perspective view of a pair of fixing devices made according to the invention, which shows the steps of removal thereof from the handlebar of a motorcycle.

It will thus be necessary to rotate each shaft 12, for example by about 90° outwards with reference to handlebar 16, as indicated by arrows $F_3$ of FIG. 8, so that the cylindrical portion of bushing 34 widens the clip spring 38, allowing the axial release, that is, the extraction in the axial direction indicated by arrows $F_2$ of FIG. 8, of such shaft 12.

It has thus been seen that the device for fixing accessories in a motorcycle, in particular for a windshield, according to the present invention achieves the objects described above. Such fixing device in fact is provided with a safety system which ensures an axial retain also in the case of loosening of the standard junction means of the same device. Moreover, the fixing device does not exhibit visible components, leaving the motorcycle aesthetics unchanged. Finally, the assembly of the fixing device according to the invention still remains simple and quick as it happens for the known fixing devices, that is, not provided with the safety system described above.

Several changes and variations can be made to the device for fixing accessories in a motorcycle, in particular for a windshield, of the present invention thus conceived, all falling within the same inventive concept; moreover, all details can be replaced with technically equivalent elements. In the practice, the materials used as well as shapes and sizes, can be whatever, according to the technical requirements.

The scope of protection of the invention therefore is defined by the annexed claims.

The invention claimed is:

1. A device (10) for fixing accessories to a motorcycle, the device (10) comprising:

a sleeve assembly configured to be attached to a fixed component of the motorcycle, the sleeve assembly including:

a generally cylindrical sleeve element (18) comprising a first end and a second end opposite the first end, wherein a longitudinal insertion axis extends through the first and second ends, the sleeve element (18) further comprising a transverse slot (40) formed at the second end thereof, and extending about a portion of the circumference of the sleeve element (18); and a spring clip (38) comprising a first portion engaging an outer circumference of the sleeve element (18), and a second portion engaged within the transverse slot (40) of the sleeve element (18);

a shaft assembly configured to be inserted into the sleeve assembly along the insertion axis and axially locked with respect to the sleeve assembly, the shaft assembly including:

a shaft (12) comprising a distal end and a proximal end opposite the distal end, wherein at least a portion (32) of the shaft (12) adjacent the proximal end is externally threaded;

a nut (30) threadingly engaged with at least part of the externally threaded portion of the shaft (12);

a frustoconical washer (28) inserted onto the shaft (12) between the nut (30) and the distal end of the shaft (12), with a conical surface of the frustoconical washer (28) facing towards the distal end of the shaft (12);

a generally tubular elastic spacer element (20) inserted onto the shaft (12) between the frustoconical washer (28) and the distal end of the shaft (12); and an axial locking element (34) fixedly connected to the shaft (12) at the distal end thereof, the axial locking element (34) including a generally cylindrical outer surface with at least one flat grooved portion (36) formed in a portion of the cylindrical outer surface, the flat grooved portion (36) facing radially outward with respect to the insertion axis;

whereby the device (10) is movable between a locked condition and an unlocked condition, the locked condition characterized by:

the elastic spacer element (20) and the axial locking element (34) being at least partially contained within the sleeve element (18) such that the flat grooved portion (36) of the axial locking element (34) is engaged with the second portion of the spring clip (38); and the nut (30) being threadingly advanced towards the distal end of the shaft (12) such that the elastic spacer element (20) is compressed axially between the frustoconical washer (28) and the axial locking element (34), thereby deforming the elastic spacer element (20) radially outward into frictional engagement with an inner surface of the sleeve element (18); and the unlocked condition characterized by:

the nut (30) being threadingly retracted away from the distal end of the shaft (12) such that the elastic spacer element (20) is in a relaxed state, frictionally disengaged from the inner surface of the sleeve element (18); and the shaft (12) being rotated about the insertion axis such that the cylindrical outer surface of the axial locking element (34) is rotated into engagement with the second portion of the spring clip (38), thereby biasing the second portion of the spring clip (38) radially outward and out of the transverse slot (40), such that the shaft assembly is axially removable from the sleeve assembly.

2. The device according to claim 1, wherein the distal end of the shaft (12) further comprises a restraining element (22, 24) abutting the axial locking element (34).

3. The device according to claim 2, wherein the restraining element (22,24) comprises a screw (22) threaded in a blind hole (26) formed in the distal end of the shaft (12), and an elastic washer (24).

\* \* \* \* \*